United States Patent Office 3,425,785
Patented Feb. 4, 1969

3,425,785
STABLE AQUEOUS DISPERSIONS OF o-DIANISI-
DINE FAST TO STORING, FOR THE PREPARA-
TION OF WATER-INSOLUBLE AZO-DYESTUFFS
ON FIBROUS MATERIALS
Hasso Hertel, Offenbach am Main, Germany, assignor to
Farbwerke Hoechst Aktiengesellschaft vormals Meister
Lucius & Bruning, Frankfurt am Main, Germany, a
corporation of Germany
No Drawing. Filed Apr. 1, 1966, Ser. No. 539,296
Claims priority, application Gremany, Apr. 8, 1965,
F 45,763
U.S. Cl. 8—46                                         4 Claims
Int. Cl. D06p 1/18 o-Dianisidine is an important intermediary product for the preparation of dyestuffs. For a long time already it is likewise used for producing water-insoluble azo-dyestuffs on the fiber according to the ice colour methods. In the dyeing and printing of fibrous materials by means of ice colours, an aqueous solution containing an excessive amount of mineral acid or a corresponding suspension of a diazotizable primary amine free from groups imparting solubility is, generaly, at first prepared. When operating in this way, the o-dianisidine is usually used in the form of a powder. This pulverulent preparation shows, however, various drawbacks which are considered very annoying when applied in the ice colour method. The pulverulent preparations can be weighed out with difficulties only, in particular they require much care in preparing the solutions and they vigorously tend to dust formation. In practice, said dusts are extremely disagreeable and due to their physiological action their use is even not free from risks. Another drawback of the pulverulent preparations is the complicated method of operation in the diazotization process. It consists in dissolving at first the o-dianisidine with hydrochloric acid and a textile auxiliary agent in boiling water, cooling the solution and then diazotizing the o-dianisidine.

Attempts have therefore been made to prepare stable solutions or dispersions of ice colour components by using organic solvents miscible with water as well as various dispersing agents. When operating in this way, it is necessary in practice that said solutions or dispersions of the ice colour components show a certain minimum concentration of about 40% by weight, since otherwise the concentrations needed for the preparation of printing pastes and padding baths would not be attained or with great difficulties only. Furthermore, it is necessary that the concentrated solutions or dispersions are sufficiently liquid since highly viscous solutions or dispersions give rise to formation of lumps and, therewith, to uneven dyeings. The use of organic solvents in the preparation of solutions or dispersions of ice colour components has proved disadvantageous since the organic solvents often impair the dyestuff formation on the fiber and in many cases cause reduced fastness to rubbing of the dyeings. It has likewise proved impossible to apply the known method of operation as disclosed in German Auslegeschrift No. 1,054,061 when o-dianisidine is concerned, since the latter precipitates already in the form of coarse crystals when the solutions are prepared. Tests made to prepare concentrated aqueous dispersions of o-dianisidine without simultaneously using organic solvents are not successful, since only highly viscous dispersions are obtained which do not meet the requirements of industrial practice.

Now I have found that it is possible to prepare stable and storable aqueous solutions of o-dianisidine of sufficient concentration which can be advantageously applied for preparing insoluble azo-dyestuffs on the fiber according to the ice-colour methods, by using as dispersing agent a non-ionic compound of the formula (I)    $RO-Ar-CH_2-Ar-O(CH_2CH_2O)_nCH_2CH_2OR$ in which Ar represents an arylene radical, R represents a low-molecular weight alkyl group, preferably an alkyl group containing from 1 to 3 carbon atoms and $n$ represents values of about 7 to about 50, preferably within the range of 14–29. In the Formula I the aryl radicals (Ar) are, preferably, phenylene or naphthylene groups which may be substituted by about 1 to 3 alkyl groups containing each up to 4 carbon atoms. As low-molecular alkyl groups (R) there are mentioned, above all, the methyl and ethyl groups.

As dispersing agents for the process of the present invention the following compounds may be used, for example:

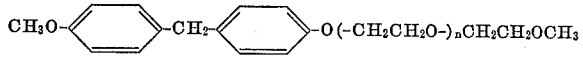

in which $n$ represents one of the integers 14, 18, 19, 22, 24 or 29,

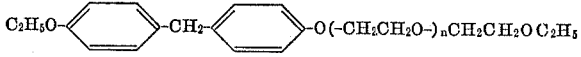

in which $n$ represents one of the integers 18 or 24,

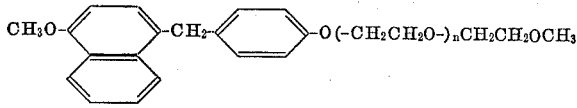

in which $n$ represents one of the integers 14, 19, 24 or 26,

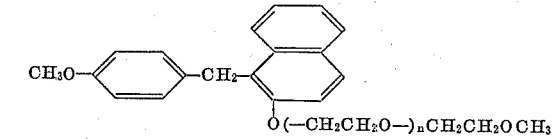

in which $n$ represents one of the integers 18, 24 or 29,

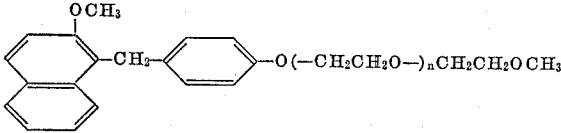

in which $n$ is one of the integers 19 or 24,

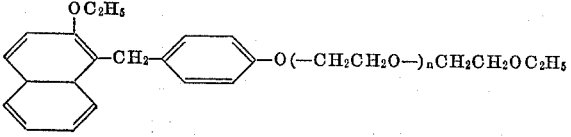

in which $n$ represents one of the integers 14, 19 or 24.

The aqueous dispersions according to the present invention are favorably prepared by mixing the o-dianisidine with the non-ionic dispersing agent of the Formula I and with water and forming a paste. It is suitable to start from the filter cake obtained in the industrial preparation of the o-dianisidine containing on an average about 15–25% of water and in which the o-dianisidine is present in the form of coarse crystals having a particle size of some hundred $\mu$ on an average. This filter cake is stirred with about 5 to 20%, preferably 8 to 12% by weight (referred to pure o-dianisidine) of the non-ionic dispersing agent and the quantity of water required for preparing the desired concentration. With a view to the industrial use of the dispersions for the preparation of developing baths, printing pastes and padding baths the concentration of the dispersions is adjusted to at least 40 percent by weight, preferably to more than 50 to about 65 percent by weight of o-dianisidine.

When preparing the dispersions according to the present invention it is possible to add small amounts of fungicides, for instance, the sodium salt of phenol-pentachloride in order to avoid the formation of mould in the course of a prolonged storage of the dispersions. Moreover, other auxiliary agents, for instance anti-freezing agents such as

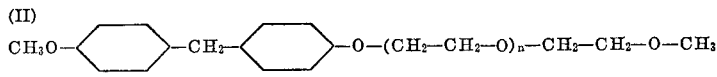

glycol, glycerine or sorbite can be added. The amount of these anti-freezing agents preferably to be added depends on the degree up to which the dispersions are to be protected against freezing; generally an addition of about 10 to about 30% referred to the weight of the water contained in the dispersions will be sufficient.

The pastes obtained containing o-dianisidine, non-ionic dispersing agent, water and, if desired, other additions, are then subjected to fine distribution whereby low-viscous dispersions are formed. The fine distribution can be attained, for instance, by grinding the substance in a roller mill filled with balls. It is, however, likewise possible to

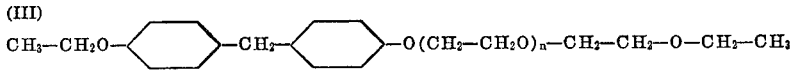

apply an oscillating mill for which procedure considerably reduced periods of time are needed for grinding, ball mills provided with stirrer being most suitable, for instance, a mill filled with sili-quartzite balls, constructed by Drais Werke G.m.b.H., Mannheim, or a sand mill filled with Ottawa sand. Said comminuting equipments provoke a very good fine distribution and are of high capacity.

The aqueous dispersions obtained according to the process of the present invention are very stable. They contain the o-dianisidine in a distribution fine enough to avoid deposition of o-dianisidine even during prolonged storage. Moreover, even in concentrations of more than 50 percent by weight up to about 65 percent by weight they are so thinly liquid that they can easily be stirred into a dyebath or into a batch for a dyebath. The dispersions can advantageously be used for preparing developing baths, padding baths or printing pastes for base printing. The tetrazotization of the o-dianisidine contained in the dispersions according to the present invention is effected in a simple manner by mixing the dispersions with the required amount of sodium nitrite solution (about 2.2 mols) and stirring the mixture into hydrochloric acid of about 10 to 20% strength (about 4.2 to 6.0 mols per mol of dianisidine) and ice. The tetrazotization is terminated after about 5 minutes and a diazo-solution free of any residue is obtained. Another possibility of tetrazotization giving the same favorable result consists in stirring into a solution of ice and hydrochloric acid at first the dispersion of o-dianisidine and then the nitrite. The ice may likewise be added after addition of the dispersions. In comparison with the operation method by means of pulverulent products a considerable advantage is obtained by sparing time and labour. Furthermore, the dispersions obtained according to the process of the present invention are considerably easier to handle and to dose than the usual pulverulent products.

The polyalkylene-glycol ethers of the Formula I used as dispersing agents according to the present invention can be prepared, for instance, by condensation of (a) aromatic hydroxy compounds, preferably phenols, with (b) oxethylated aromatic hydroxy compounds, preferably reaction products of 7 to 50 mols of ethylene-oxide with 1 mol of phenols and (c) formaldehyde, in the presence of acid catalysts and subsequent alkylation. The preparation of the dispersing agents is described, for instance, in French Patent 1,318,165.

The following examples serve to illustrate the invention but they are not intended to limit it thereto:

EXAMPLE 1

A drum-mill of porcelain (capacity 1 liter) is charged with a mixture of 215 grams of moist o-dianisidine (water content 18.4%), 14 grams of a polyalkylene-glycol ether of the formula in which $n$ stands for an integer of about 18, 40 grams of a 70% aqueous sorbite-solution, 0.2 gram of the sodium salt of phenol-pentachloride and 81 grams of water as well as 700 grams of porcelain balls (diameter 8–20 mm.). After rolling for 3 to 5 days on a rolling equipment the necessary fine distribution is attained. The thinly liquid dispersion that has formed and which shows a content of 50% of o-dianisidine can be separated from the balls.

The sorbite-solution can be replaced totally or partially by glycerine or glycol.

A dispersion of similar properties is obtained by using a polyalkylene-glycol ether of the formula in which $n$ represents about 18.

EXAMPLE 2

2170 grams of moist o-dianisidine having a water content of 17% are thoroughly stirred with 120 grams of the polyalkylene-glycol ether used in Example 1, 300 grams of a 70% aqueous sorbite solution, 3.5 grams of the sodium salt of phenol-pentachloride and 310 grams of water and then ground in two operations in a continuously working mill filled with Ottawa sand.

EXAMPLE 3

An iron drum mill bummed inside (contents 2.7 l.) is charged with 613 grams of moist o-dianisidine (pure content 90%), 43 grams of the polyalkylene-glycol ether used in Example 1, 80 grams of glycol, 1 gram of the sodium salt of phenol-pentachloride and 262 grams of water as well as 2 kilograms of steatite balls (18 mm. of diameter). The mass is ground for 4 days on the rolling equipment and the formed thinly liquid dispersion (content of o-dianisidine 55%) is separated from the balls.

Instead of glycol, glycerine may likewise be used. If the quantity of dianisidine is increased to 667 grams, the amount of polyalkylene-glycol ether to 47 grams and the amount of water is reduced correspondingly, a dispersion is obtained containing 60% of o-dianisidine.

EXAMPLE 4

By means of a fast-running toothed disc stirrer 165 grams of o-dianisidine, 15 grams of a polyalkylene-glycol ether of the formula

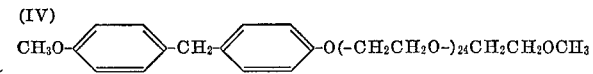

70 grams of water, 50 grams of glycerine, 0.5 gram of the sodium salt of phenol-pentrachloride and 0.5 gram of triisobutyl-phosphate are stirred to a paste within 5 minutes. This paste is ground for 30 minutes in a discontinuously working ball mill provided with stirrer of a capacity of 1 liter and charged with 1 kilogram of sili-quartzite balls (diameter 0.5 to 3 mm.) and then separated from the grinding balls by sucking it off by means of a filter. A thinly liquid o-dianisidine dispersion is obtained which is stable to freezing. A dispersion showing the same properties is obtained by using 15 grams of a polyalkyleneglycol ether of the formula (V) 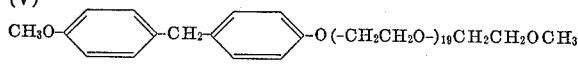

all other conditions being unchanged.

EXAMPLE 5

By means of a fast-running toothed disc-stirrer 165 grams of o-dianisidine, 16 grams of a polyalkylene ether of the formula (VI) 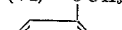
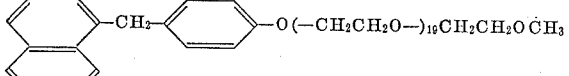

118 grams of water, 0.6 gram of the sodium salt of phenol-pentarchloride and 0.5 gram of triisobutyl-phosphate are stirred to form a paste within 5 minutes. This paste is ground for 30 minutes in a discontinuously working ball mill provided with stirrer, of a capacity of 1 liter and charged with 1 kilogram of sili-quartzite balls (diameter 0.5 to 3 mm.) and then separated from the grinding balls by sucking it off and filtering it. A thinly liquid o-dianisidine dispersion is obtained.

EXAMPLE 6

By means of a fast-running toothed disc stirrer 165 grams of o-dianisidine, 16 grams of a polyalkylene-glycol ether of the formula (VII) 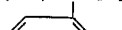

118 grams of water, 0.6 gram of the sodium salt of phenol-penta-chloride and 0.5 gram of triisobutyl-phosphate are stirred for 5 minutes to form a paste. This paste is ground for 30 minutes in a discontinuously working ball mill provided with stirrer, of a capacity of 1 liter and charged with 1 kilogram of sili-quartzite balls (diameter 0.5–3 mm.), then separated from the grinding balls by sucking it off and filtering it. A thinly liquid o-dianisidine-dispersion is obtained.

EXAMPLE 7

By means of a fast-running toothed disc stirrer 165 grams of o-dianisidine, 16 grams of a polyalkylene-glycol ether of the formula (VIII) 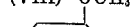

118 grams of water, 0.6 gram of the sodium salt of phenol-pentachloride and 0.5 gram of triisobutyl-phosphate are stirred to form a paste within 5 minutes. This paste is ground for 30 minutes in a discontinuously working ball mill provided with stirrer, of a capacity of 1 liter and charged with 1 kilogram of sili-quartzite balls (diameter 0.5–3 mm.), then separated from the grinding balls by sucking it off and filtering it. A thinly liquid o-dianisidine-dispersion is obtained.

If instead of 118 grams of water 70 grams of water and 50 grams of ethylene-glycol are used, all other conditions being unchanged, a dispersion is obtained which is stable to freezing.

I claim:

1. A stable aqueous dispersion of o-dianisidine for the preparation of water-insoluble azo-dyestuffs on fibrous materials, which dispersion contains as dispersing agent a non-ionic compound of the formula RO—Ar—CH$_2$—Ar—O—(CH$_2$CH$_2$O)$_n$—CH$_2$CH$_2$OR in which Ar represents phenylene or naphthylene radicals or such radicals which are substituted by alkyl groups containing up to 4 carbon atoms, R represents an alkyl radical having 1 to 3 carbon atoms, and $n$ is an integer of 7 to 50.

2. A stable aqueous dispersion of o-dianisidine as claimed in claim 1, which dispersion contains 5 to 20% of the aforesaid dispersing agent, referred to the weight of o-dianisidine.

3. A stable dispersion of o-dianisidine as claimed in claim 1, which contains as dispersing agent a compound of the formula

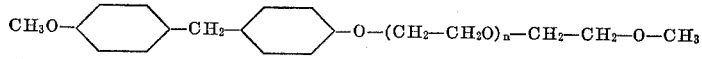

wherein $n$ is an integer of 16 to 25.

4. A stable dispersion of o-dianisidine as claimed in claim 1, which contains as dispersing agent a compound of the formula

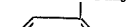

wherein $n$ is an integer of 16 to 25.

References Cited

UNITED STATES PATENTS

| | | | |
|---|---|---|---|
| 3,003,844 | 10/1961 | Jelinek et al. | 8—45 |
| 3,288,552 | 11/1966 | Streck | 8—44 |

J. TRAVIS BROWN, *Primary Examiner.*

T. J. HERBERT, JR., *Assistant Examiner.*

U.S. Cl. X.R.

8—44, 93